(12) United States Patent
Duan (10) Patent No.: US 6,676,555 B2
(45) Date of Patent: Jan. 13, 2004

(54) CONE FRICTION CLUTCH

(75) Inventor: Xiaohong N. Duan, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 51 days.

(21) Appl. No.: 10/017,555

(22) Filed: Dec. 14, 2001

(65) Prior Publication Data

US 2003/0114264 A1 Jun. 19, 2003

(51) Int. Cl.$^7$ .............................................. F16H 48/06
(52) U.S. Cl. ....................................................... 475/231
(58) Field of Search ............................. 192/66.2, 54.52, 192/93 A, 84.6; 475/231, 150

(56) References Cited

U.S. PATENT DOCUMENTS

| | | |
|---|---|---|
| 936,284 A | 10/1909 | Abernethy |
| 1,300,898 A | 4/1919 | Vincent |
| 1,739,399 A | 12/1929 | Kavle |
| 2,510,469 A | 6/1950 | Greenlee |
| 3,982,610 A | 9/1976 | Campagnolo |
| 4,022,308 A | 5/1977 | Hurst |
| 4,162,637 A * | 7/1979 | Altmann .................. 475/231 |
| 4,269,086 A * | 5/1981 | Altmann .................. 475/231 |
| 4,416,359 A | 11/1983 | Miller |
| 4,719,817 A | 1/1988 | Azuma |
| 4,805,486 A | 2/1989 | Hagiwara et al. |
| 4,838,118 A | 6/1989 | Binkley |
| 5,007,886 A | 4/1991 | Holmquist et al. |
| RE33,742 E | 11/1991 | Blessing et al. |
| 5,080,640 A | 1/1992 | Botterill |
| 5,092,825 A | 3/1992 | Goscenski, Jr. et al. |
| 5,106,349 A | 4/1992 | Botterill et al. |
| 5,178,582 A | 1/1993 | Maji et al. |
| 5,445,574 A | 8/1995 | Sekiguchi et al. |
| 5,829,566 A | 11/1998 | Winks et al. |
| 5,938,556 A | 8/1999 | Lowell |
| 5,960,916 A | 10/1999 | Organek et al. |
| 5,964,330 A | 10/1999 | Organek et al. |
| 6,001,040 A * | 12/1999 | Engle ................. 475/231 X |
| 6,027,422 A * | 2/2000 | Yamazaki ................. 475/231 |
| 6,041,903 A | 3/2000 | Burns et al. |
| 6,076,644 A | 6/2000 | Forrest et al. |
| 6,261,202 B1 | 7/2001 | Forrest et al. |
| 6,309,320 B1 | 10/2001 | Forrest et al. |

FOREIGN PATENT DOCUMENTS

| | | |
|---|---|---|
| EP | 1 098 111 | 5/2001 |
| FR | 2 704 287 | 10/1994 |
| JP | 2000297861 A * | 4/1999 |

OTHER PUBLICATIONS

Combined Search and Examination Report, dated Sep. 18, 2002, for corresponding British Patent Application No. 0209341.7.

* cited by examiner

*Primary Examiner*—Roger Pang
(74) *Attorney, Agent, or Firm*—Brinks Hofer Gilson & Lione (57) ABSTRACT

A cone clutch mechanism that is controlled by an electronic control unit is disclosed. The cone clutch mechanism features simplicity of construction and a control system to engage or disengage shaft power on the vehicle according to vehicle stability and traction control requirements. The mechanism may be used to selectively transfer the power to desired shafts or wheels.

9 Claims, 5 Drawing Sheets

CONE FRICTION CLUTCH

FIELD OF THE INVENTION

The present invention is directed to automotive power transmission devices, and in particular to an electromechanically actuated clutch useful for automotive couplings, differentials and transmissions.

BACKGROUND OF THE INVENTION

Automotive power transfer systems face many demands from consumers. Users of automobiles, trucks, and even off-road vehicles expect their vehicles to get them safely and quickly to their destination, no matter what the obstacles or road conditions. Automotive differentials allow two wheels mounted on output half shafts to rotate at different speeds, helping trucks and cars accomplish turns. However, in a conventional differential, when one wheel loses traction, the other wheel may also lose power. In a limited slip differential, when one wheel has less traction with the road than the other wheel, power is transferred from the slipping wheel to the non-slipping wheel. Under these conditions, the wheel that slips has an opportunity to regain traction, while the wheel that grips has increased power to keep moving and perhaps to keep the vehicle moving.

Some positive limited slip differentials are presently in the marketplace. One problem with such differentials, such as those depicted in U.S. Pat. No. 6,261,202, is that they tend to be controlled by the relative speed of the wheels as well as a force or a preload applied to side gears in the differential. Another problem is that the driver or operator has little control over when the differential engages and begins to transfer power. It would be useful if there were a slipping differential that could be controlled automatically, or that would automatically engage when needed. It would also be helpful if the differential could engage a drive shaft with a mechanism less complicated than the present implementation, such as the type of device depicted in U.S. Pat. No. 5,938,556. The differential depicted in this patent is very complicated and uses numerous friction clutch plates and a great many parts requiring tight manufacturing tolerances.

What is needed is a clutch assembly requiring less complicated parts and assembly, and yet having a reliable ability to engage and disengage a driving member from a driven member. What is also needed is a differential that can be engaged or disengaged upon demand by a vehicle and driving conditions experienced by the vehicle.

BRIEF SUMMARY OF THE INVENTION

One aspect of the invention is a cone friction clutch for engaging a shaft. The clutch comprises a carrier having a tapered bore and an external gear defined thereon. The external gear is meant for engaging a source of mechanical power, such as a ring gear. The clutch includes a tapered piston within the bore and means for moving the tapered piston into contact with the carrier. The tapered piston may rotate with the shaft. The clutch also includes means for controlling the movement of the piston. The means for controlling causes the means for moving to move the tapered piston into contact with the carrier. Power is thus transmitted between the carrier and the shaft.

Another aspect of the invention is a clutch for engaging a shaft. The clutch comprises a carrier having a first tapered bore and an external gear. A first tapered piston is provided within the bore, the piston surrounding and rotating with the shaft. There is a first mechanism for moving the tapered piston, the mechanism selected from the group consisting of a ball and ramp mechanism, a hydraulic pump, and a solenoid. There is also a controller for controlling a movement of the mechanism and the piston into contact with the carrier. Thus, power is transmitted between the carrier and the shaft.

Another aspect of the invention is a coupling for use in a power transmission having an on-demand shaft. The coupling comprises a carrier having a tapered bore and an external gear defined thereon, and also comprises a tapered piston with the bore for rotating with the shaft. A mechanism for moving the tapered piston is provided and is selected from the group consisting of a ball and ramp mechanism, a hydraulic pump, and a solenoid. There is also a controller for controlling movement of the tapered piston. The controller controls movement of the mechanism and the piston into contact with the carrier, and power is then transmitted between the carrier and the shaft.

Another aspect of the invention is a method for engaging a shaft. The method comprises providing a cone-friction clutch with a tapered piston for engaging the shaft. The method then includes controlling movement of the piston through an electronic controller, and moving the piston into engagement with the shaft. Many embodiments and other aspects of the invention will be readily apparent in view of the drawings and detailed descriptions provided below.

BRIEF DESCRIPTION OF SEVERAL VIEWS OF THE DRAWINGS

FIG. 3b is a frontal cross-section view of the embodiment of FIG. 3a.

DETAILED DESCRIPTION OF THE PRESENTLY PREFERRED EMBODIMENTS OF THE INVENTION

The need for vehicle stability control and traction control requires automotive power transfer systems that can selectively transfer driving power to desired wheels according to road and driving conditions. Automatically controlled devices enhance vehicle traction and stability. These may include coupling devices used to transfer torque from front to rear or rear to front in on-demand four-wheel drive vehicles. These coupling devices may include limited slip differentials, which transfer torque from side to side, or may include twin couplings that transfer torque from front to rear or rear to front and from side to side. One embodiment of the invention is a less-complex clutch that can engage and disengage automatically. Power is thus transferred through the device, controlled electronically by a controller according to current vehicle dynamic performance and driving conditions.

Figure 1:
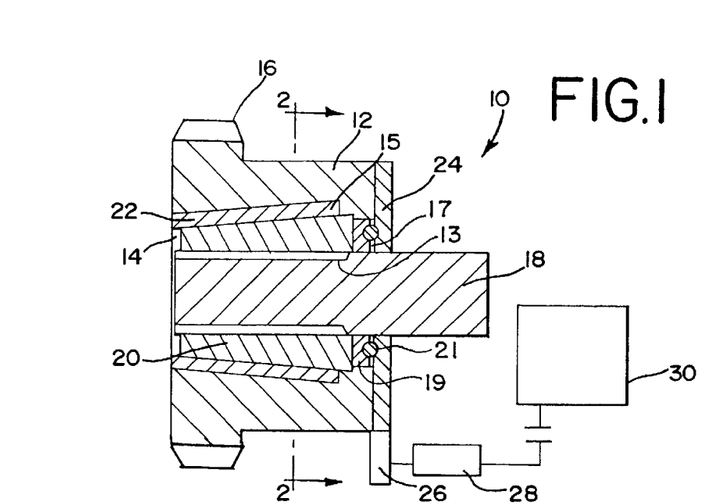
FIG. 1 is a side cross-sectional view of a first embodiment of the present invention.

FIG. 1 is a cross-sectional view of an embodiment of a cone friction clutch 10 having a carrier housing 12 with a tapered internal bore 14 and an external gear 16. The cone friction clutch is meant to engage shaft 18. Tapered piston 20 rotates with the shaft 18, while split ring spring 22 is designed to surround the tapered piston 20. In one embodiment, the tapered bore 14 has a shoulder 15 to restrain the split ring spring when the piston is withdrawn. A ball and ramp mechanism 24 is in contact with the piston for moving the piston within the tapered bore and into contact with the split ring spring 22. Movement of the ball and ramp mechanism 24 is controlled by the motor 28 and gear reduction train 26, under the control of controller 30.

Controller 30 may be a separate, independent controller, such as a microprocessor controller, a computer, a digital signal processor, and the like. The control functions of the controller may also be embedded within another computer or microprocessor on board the vehicle, such as an electronic control unit, an engine electronic controller, an antilock brake system controller, a traction control system, or other computer or controller.

Figure 2:
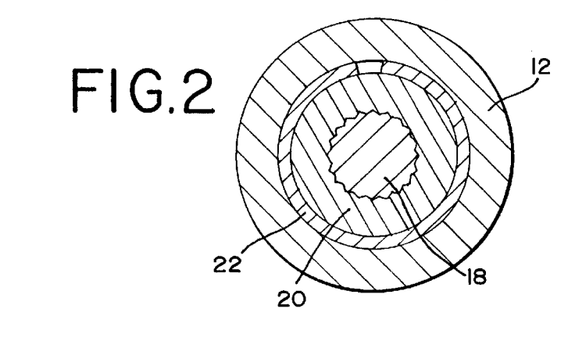
FIG. 2 is a frontal cross-sectional view along line 2—2 of FIG. 1.

FIG. 2 is a view taken at 90° to FIG. 1 along line 2—2. The carrier 12 may be an outer housing for the cone clutch. In this embodiment, split ring spring 22 fits on the tapered piston 20. Shaft 18 may be splined externally and piston 20 may have an internal spline matching that of the shaft for rotation therewith. Alternatively, there may be a keyway 13 between shaft 18 and piston 20 to allow them to rotate together but still allowing the piston to translate from left to right and back. The carrier may rotate freely without engaging the shaft and piston until the ball and ramp mechanism forces the piston to wedge against the split ring spring and engage the carrier.

In operation, the cone friction clutch works in the following manner. The electronic control unit 30 receives vehicle dynamic and driving condition signals from sensors described below and sends out a control signal to electric motor 28 to start or stop the motor in accordance with the signals. The controller controls the forward and backward rotation of the motor 28 and gear train 26. A rotor 17 of the ball and ramp mechanism rotates, forcing a stator 19 forward via balls 21 captured in pathways between the rotor and stator portions of the ball and ramp mechanism. When the stator portion moves forward (to the left in FIG. 1), the piston 20 moves to the left, wedging ring spring 22 into tapered bore 14 of the carrier 12. If the carrier is rotating from motion of another gear with external gear 16 on the carrier, then the motion will be transferred to the shaft 18 through split ring spring 22 and tapered piston 20. The torque transferred by the clutch is proportional to the pushing force delivered by the ball and ramp mechanism to the piston. The force depends on the motor output torque, which is controlled by controller 30. It will be seen that cone friction clutch is an on-demand clutch, controlled by controller 30, in accordance with inputs from sensors or control devices.

Figure 3A:
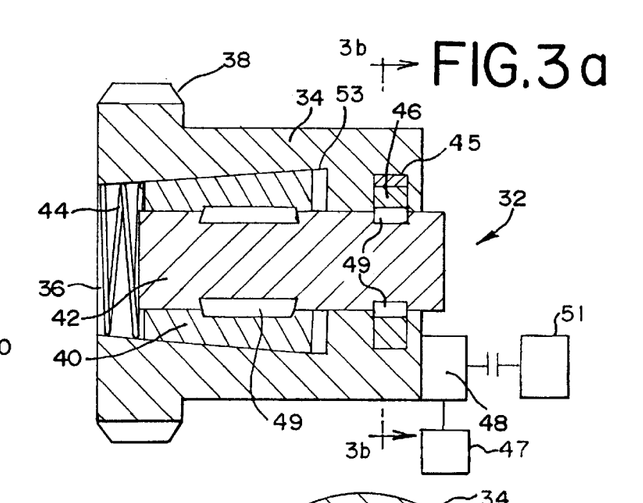
FIG. 3a is a side cross-sectional view of a second embodiment of the present invention.
Figure 3B:
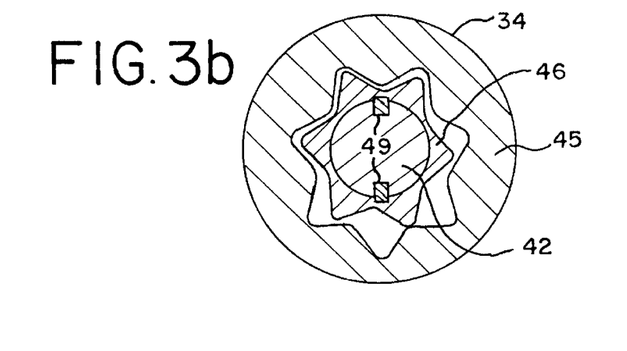

Another embodiment of the invention using a gerotor pump is depicted in FIG. 3a and another sectional view of FIG. 3a, across line 3b—3b, is shown in FIG. 3b. A gerotor pump works by causing an inner gear to rotate within an outer gear. The gears unmesh on the suction side to draw fluid in, then the gears mesh on the discharge side to force fluid out. The stator typically has one more gear than the rotor. As the rotor rotates, oil is forced from the suction to a discharge of the pump.

Cone friction clutch 32 comprises a housing 34 having a tapered bore 36 and an external gear 38. Within the housing is a piston 40 for rotation with shaft 42. This embodiment does not make use of a split ring spring between the piston and the carrier. There is however, a torsion-type spring 44 grounded to the carrier 34 and urging the piston back to a non-engaged position (to the right in FIG. 3a). There is a hydraulic pump, such as a gerotor pump, whose outer rotor 45 is attached to carrier 34 and inner rotor 46 is attached to shaft 42 with one or more keyways 49. When the rotation speeds of carrier 34 and shaft 42 are different, the gerotor rotors 45 and 46 will also have different speeds, and the pump will pump hydraulic oil. Hydraulic oil from reservoir 47 is pumped by the gerotor to a sealed annular piston chamber 53. The hydraulic oil pressure in chamber 53 is controlled by control valve unit 48 and system controller 51. Pressurized oil pushes the piston 40 to the left in FIG. 3a, engaging the piston 40 with carrier 34, and imparting rotation to the piston 40 and shaft 42. When the carrier 34 and shaft 42 rotate at the same speed, the pump stops pumping. In order to disengage, the control unit may simply allow the hydraulic fluid to bleed back to reservoir 47. The spring 44 will then urge the piston back to a non-engaged position (to the right in FIG. 3a).

Figure 4:
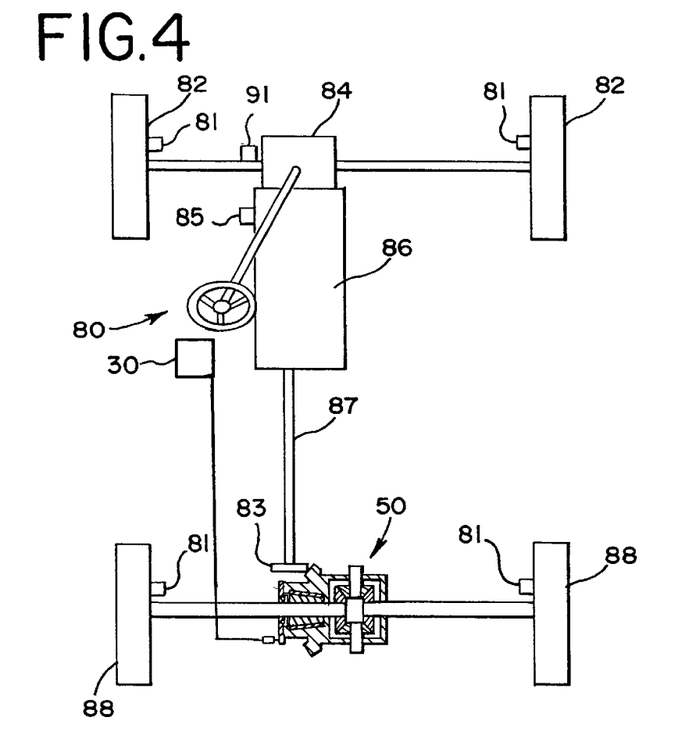
FIG. 4 is a schematic view of a cone friction clutch used in an auto.

FIG. 4 depicts a limited slip differential 50 in an automobile or truck 80. Power is generated by an engine 84 and transferred through a transmission 86 and drive shaft 87 to send power to a limited slip differential 50, and to two rear wheels 88. In normal driving conditions, the clutch is disengaged and the differential allows two wheels to rotate at different speeds, necessary for making turns and other maneuvers. In slippery road conditions, when one wheel loses traction, that wheel will rotate much faster than another wheel having good traction. The embodiment of FIG. 4 is depicted with the control unit 30 from FIG. 1. The control unit 30 will detect such a difference in wheel speeds by signals from sensors. Sensors on the vehicle or other application may include shaft or wheel speed sensors 81, desirably one sensor for each shaft. The sensors will also desirably include those useful in determining and controlling the direction of the vehicle, such as a steering angle sensor 85 for the vehicle, and a yaw rate sensor 91. These sensors will yield readings indicating a desired direction and an actual direction, respectively, for the vehicle. The controller will receive signals from these sensors and may send out a control signal to engage the clutch. This is known as "on-demand" engagement. Once the clutch is engaged, it forces the two wheels to rotate at the same speed. Power from the engine can thus be transferred to the wheel with good road traction.

Figure 5:
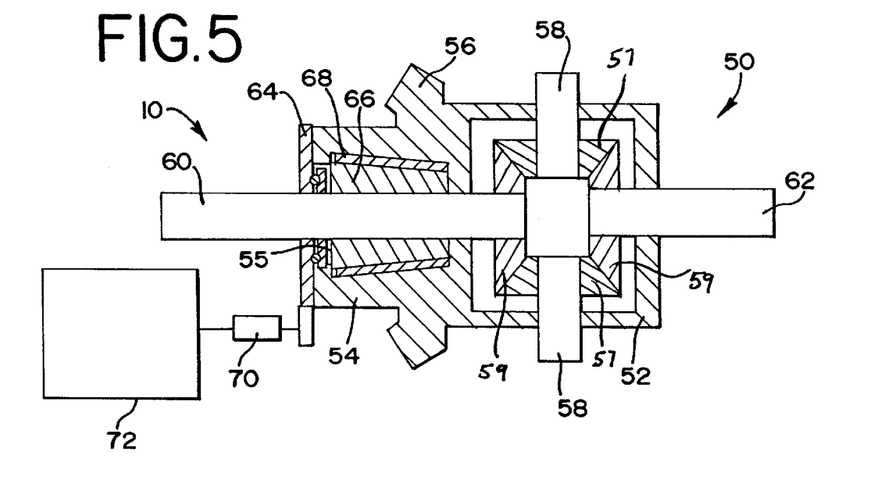
FIG. 5 is a cross-sectional view of a limited slip differential embodiment embedding a cone friction clutch.

FIG. 5 depicts details of the cone friction clutch 10 of FIG. 1 used in the limited slip differential 50 of FIG. 4. The differential includes a differential housing 52, 54 and the cone friction clutch and differential gears, which include two pinion gear assemblies 58 and two side gears 59. Side gears 59 are separately fixed on two half-axles or wheel shafts, 60, 62. Power is transmitted from a drive shaft 87 and driving pinion gear 83 to turn external ring gear 56 and differential housing 52, 54. When the differential housing turns, the differential pinion gear assemblies 58 and pinion gears 57 turn with it. The axle side gears 59, meshed with the pinion gears 57, also rotate, and thus half-shafts 60, 62 rotate. The differential housing 54 also has a tapered void 55 with a split ring spring 68. Tapered cone 66 rotates with half shaft 60. A ball and ramp mechanism 64 is in contact with the tapered cone 66 for wedging the tapered cone further into the void 55 to engage split ring spring 68 with tapered cone 66, forcing differential housing 52 and shaft 60 to rotate together when the cone clutch is engaged. The ball and ramp mechanism 64 is driven by electric motor 70 in response to a control unit 72.

When the cone clutch is disengaged, the shafts 60, 62 can rotate at different speeds. When the clutch is engaged, the clutch forces differential housing 52, 54 and half shaft 60 to rotate at the same speed. The left side gear mounted on half shaft 60 also rotates at same speed as differential housing 52, 54, as do differential pinion gears 58. The right side gear and other half shaft 62 will also rotate at this speed, and thus the two half-shafts 60, 62 will turn at the same speed, as will wheels attached to the half-shafts.

Figure 6:
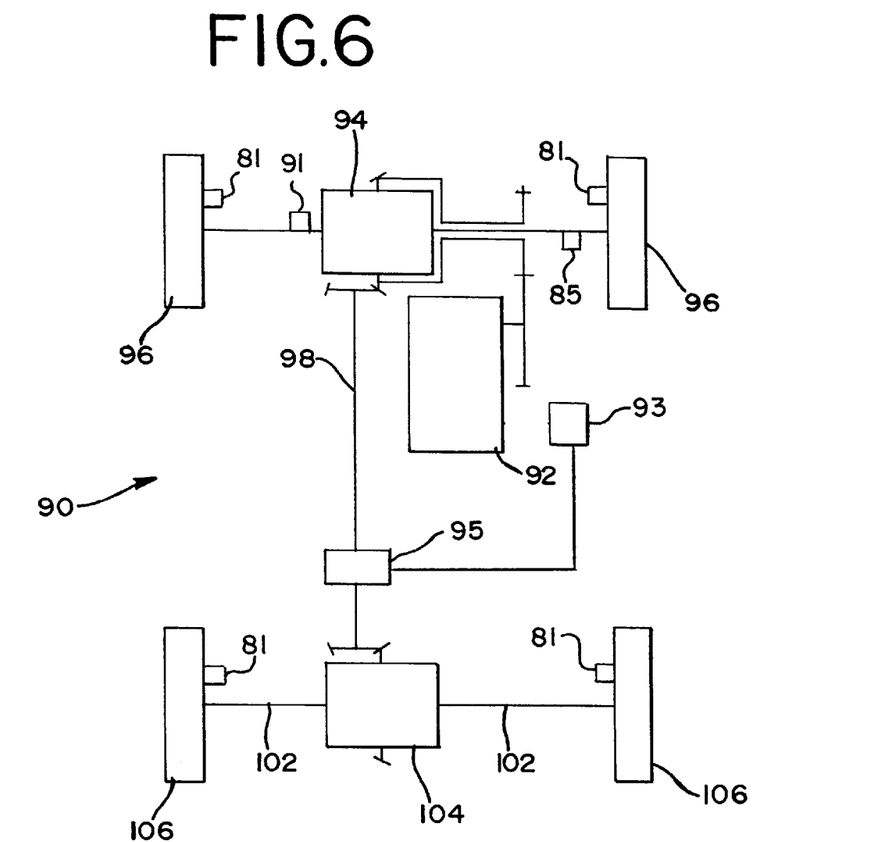
FIG. 6 is a schematic view of another application of the invention.

FIG. 6 is another application of the cone friction clutch, this time to vehicle 90 using 4-wheel drive "on demand" only when a signal from control unit 93 commands engagement of the clutch. The cone friction clutch 95 may be an embodiment 10, 32, or 50 shown previously, or may be a different embodiment. Vehicle 90 has an engine and transmission 92 and may have a differential 94 powering front wheels 96. There is also a drive shaft 98 providing power from the transmission to a cone friction clutch 95, acting as a coupling device to transmit power from the drive shaft 98 to the rear differential 104. Front and rear differentials 94, 104 may be any desired differentials, including a conventional differential, a limited-slip differential, or other differential. In the rear of the auto or truck 90, the differential 104 provides power to wheel shafts or half-shafts 102 and then to rear wheels 106.

The vehicle 90 may have a controller 93 suitable for controlling the cone friction clutch 95. The controller may be similar to the controllers depicted in FIGS. 1, 3a, 4, and 5. Controller 93 receives signals from wheel or shaft speed sensors 81, a vehicle yaw rate sensor 85, and a steering angle sensor 91. When the controller determines that rear-wheel drive is needed, the cone friction clutch is activated, and power is transmitted to rear axle halves 102 and wheels 106.

Figure 7:
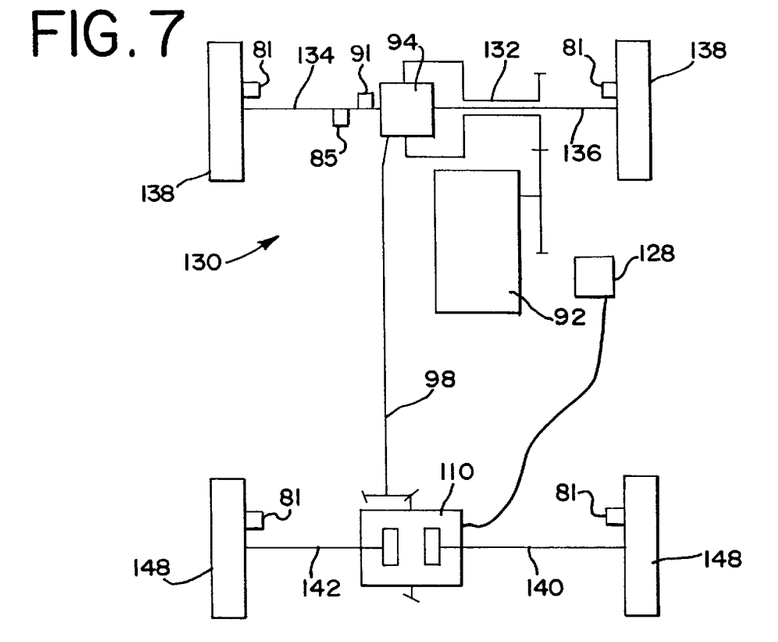
FIG. 7 is a schematic view of an auto or truck using a twin-coupling embodiment of the present invention.

Rather than using the embodiment of FIG. 1, the embodiment of FIG. 3 may also be used, or any other cone friction clutch according to the present invention, in which on-demand engagement of the cone clutch is controlled by an electronic control unit. Another embodiment is depicted in FIG. 7, in which a twin-coupling device 110 is used to transfer power on demand by controller 128 to a rear set of wheels. An auto or truck 130 has an engine and transmission 92 and a front differential 94, by which it transmits power to half axles 134, 136 and then to front wheels 138. The transmission has a drive shaft or power take off shaft 98 for driving twin coupling 110, depicted in FIG. 8. The clutch provides power to rear shafts or half-axles 140, 142, and then to the wheels 148 of the truck or car. Controller 128 receives inputs from shaft or wheel speed sensors 81, and from yaw rate sensor 85, and steering angle sensor 91 to determine when better control is needed and the clutch is activated.

Figure 8:
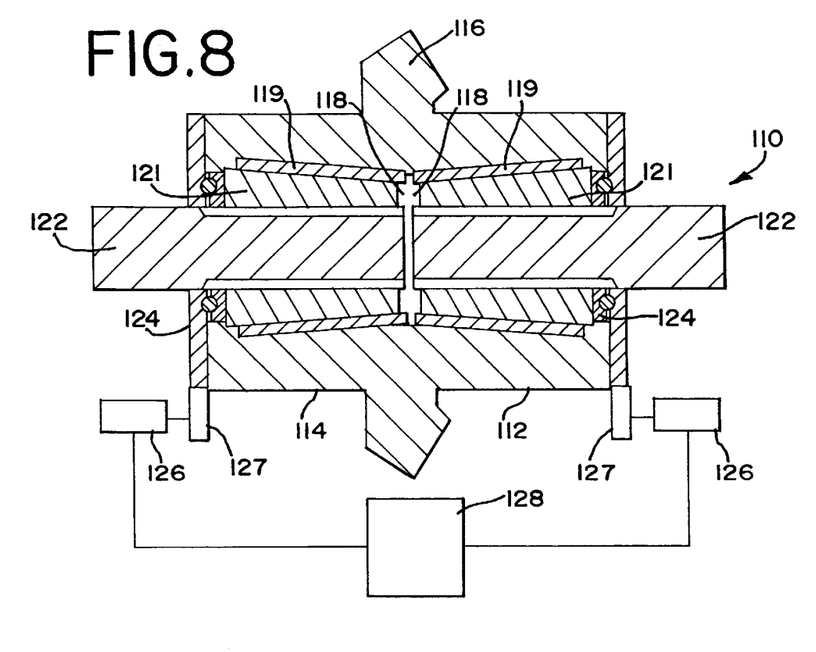
FIG. 8 is a cross-sectional view of a twin-coupling cone friction clutch of the present invention.

This coupling is depicted in FIG. 8, in which a controller 128 controls two ball and ramp devices 124 by means of electric motors 126. The twin-coupling embodiment 110 includes a housing, desirably in at least two parts 112, 114, for ease of assembly of the internal components parts. There is space within the assembled housing 112, 114, for two tapered voids 118, containing split ring springs 119 and tapered pistons 121. The split ring springs may surround the tapered pistons, while the pistons, as depicted in FIG. 1, may fit against the shafts 122, for rotation therewith. The clutches may both be disengaged, both engaged or only one engaged according to the control signal from the electronic control unit 128. Power may thus be transferred to one or two rear wheels, or to no rear wheels.

In operation, a drive shaft causes the external gear 116 to rotate, causing housing 112, 114 to rotate about an axis formed by the shafts 122. In slippery road conditions, the controller calls for engagement, causing electric motor 126 to turn through gear set 127, causing ball and ramp 124 to rotate and pushing piston 121 into frictional contact with the split ring spring 119. This engages the shaft 122 with the carrier 112, 114, and it may be either shaft 122 or both (or neither). The amount of torque that may be transferred by each clutch is also controlled by the electronic control unit by controlling the output of the electric motor according to vehicle dynamic performance requirements. When conditions improve and the clutch is no longer needed, an appropriate signal is sent by the electronic control unit 128 to reverse the ramp direction, move the pistons back to a resting state, and allow the wheels to spin freely.

Figure 9:
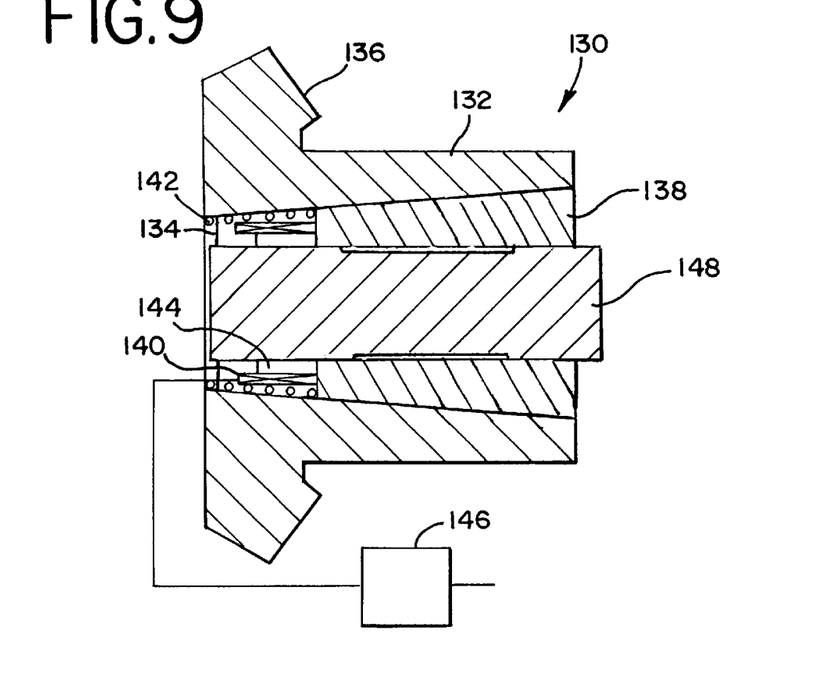
FIG. 9 is a schematic view of an embodiment using a solenoid to control movement of the piston in accordance with the present invention.

FIG. 9 depicts another embodiment of a cone friction clutch 130 having a solenoid actuator. The clutch comprises a housing 132 having a tapered bore 134 and an external gear 136. Within the bore 134 is a tapered cone 138 with a solenoid 140. Solenoid 140 is controlled by controller 146 and is responsive to signals or commands from controller 146. The controller may be the same as the controller depicted in FIG. 8, or it may be different. When the solenoid is not actuated, spring 142 urges the cone to the right, or out of engagement with the housing 132 and the shaft 148. In this embodiment, the solenoid plunger 144 moves the cone 138 inward, to the left in FIG. 9, to engage the cone 138 with the tapered bore 134, the housing 132 and the shaft 148. Actuating the solenoid moves the cone and thus the shaft into engagement.

Figure 10:
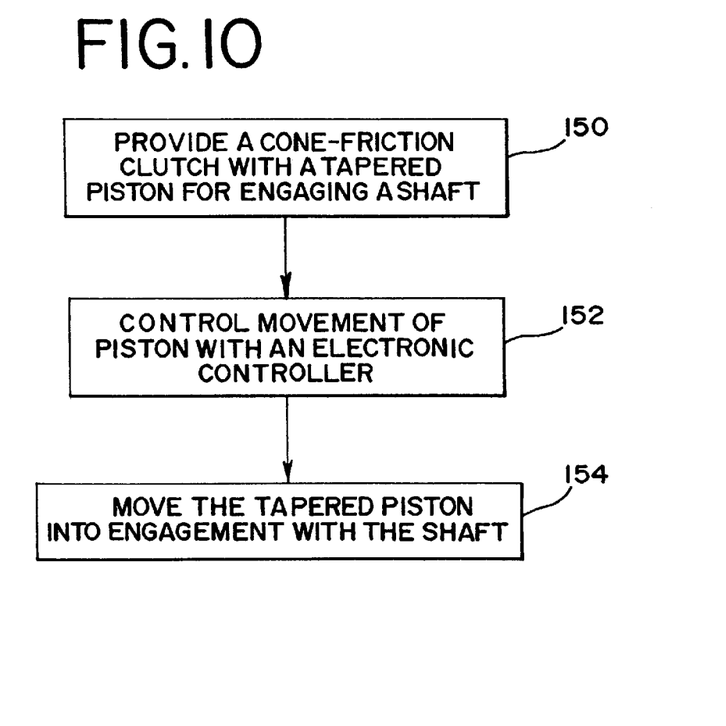
FIG. 10 is a flow chart for a method of using a cone friction clutch in accordance with the present invention.

Other embodiments are also possible. For instance, a return spring grounded at the narrow end of the tapered bore may be held in compression, urging the cone out of engagement. There are many ways to practice the invention. Another way is to practice the invention is a method for engaging a shaft, as depicted in FIG. 10. The method includes providing a cone-friction clutch with a tapered piston for engaging the shaft 150. The method then includes controlling movement of the tapered piston (and thus the force of the piston) through an electronic controller 152; and moving the tapered piston into engagement with the shaft 154.

It is therefore intended that the foregoing description illustrates rather than limits this invention, and that it is the following claims, including all equivalents, which define this invention. Of course, it should be understood that a wide range of changes and modifications may be made to the embodiments and preferences described above. Accordingly, it is the intention of the applicants to protect all variations and modifications within the valid scope of the present invention. It is intended that the invention be defined by the following claims, including all of the equivalents thereto.

What is claimed is:

1. A cone friction clutch for engaging a shaft, the clutch comprising:

a carrier having a tapered bore and an external gear defined thereon;

a tapered piston rotating with the shaft within the bore;

a split ring spring outside the tapered piston;

means for moving the tapered piston into contact with the carrier; and means for controlling movement of the piston, wherein the means for controlling movement causes the means for moving to move the tapered piston into contact with the carrier, and power is transmitted between the carrier and the shaft.

2. The clutch of claim 1 wherein the means for moving is selected from a group consisting of a ball and ramp, a solenoid, and a hydraulic mechanism.

3. The clutch of claim 1 wherein the means for controlling is selected from a group consisting of a computer, a microprocessor controller, an electronic control unit, a hydraulic controller, an engine control unit, an antilock brake system controller, a traction system controller, and an engine electronic controller.

4. The clutch of claim 1 wherein the means for moving is selected form a group consisting of a ball and ramp, a solenoid, a hydraulic mechanism, an electric motor and a hydraulic pump.

5. The clutch of claim 2 further comprising a differential gear set attached to the carrier and a first and a second shaft, the first shaft in contact with the tapered piston for controllable contact with the tapered bore.

6. A limited slip differential for an automobile having a rear differential and two half-axles, the limited slip differential comprising:

a carrier having a tapered bore and an external gear defined thereon for interfacing with a drive shaft, the carrier in geared contact through a set of differential gears with a first and a second half-axle;

a tapered piston for rotating with the first half-axle within the bore;

a split ring spring for rotation with the tapered piston:

a mechanism for moving the tapered piston, the mechanism selected from a group consisting of a ball and ramp mechanism, a hydraulic pump, and a solenoid; and a controller for controlling movement of the tapered piston, wherein the controller controls movement of the piston into contact with the carrier, and power is transmitted between the first half-axle and the carrier.

7. A coupling for use in a power transmission having an auxiliary driving shaft, the coupling comprising:

a carrier having a tapered bore and an external gear defined thereon;

a tapered piston within the bore for rotating with the auxiliary driving shaft;

a split ring spring for rotation with the tapered piston;

a mechanism for moving the tapered piston, the mechanism selected from a group consisting of a ball and ramp mechanism, a hydraulic pump, and a solenoid; and a controller for controlling movement of the tapered piston, wherein the controller controls movement of the mechanism and the piston into contact with the carrier, and power is transmitted from the carrier to the auxiliary driving shaft.

8. The coupling of claim 7, wherein the auxiliary driving shaft is selected from a group consisting of a differential power shaft, a half-axle, and a power take-off shaft.

9. The coupling of claim 8, wherein the controller is selected from a group consisting of a computer, a microprocessor controller, an electronic control unit, a hydraulic controller, an engine control unit, an antilock brake system controller, a traction system controller, and an engine electronic controller.

* * * * *

UNITED STATES PATENT AND TRADEMARK OFFICE
CERTIFICATE OF CORRECTION

PATENT NO. : 6,676,555 B2  Page 1 of 1
DATED : January 13, 2004
INVENTOR(S) : Xiaohong N. Duan It is certified that error appears in the above-identified patent and that said Letters Patent is hereby corrected as shown below:

<u>Column 7,</u>
Line 23, after "selected" delete "form" and substitute -- from -- in its place.

Signed and Sealed this

Twenty-fifth Day of May, 2004

JON W. DUDAS
*Acting Director of the United States Patent and Trademark Office*